(12) United States Patent
Behravan et al.

(10) Patent No.: US 8,958,319 B2
(45) Date of Patent: Feb. 17, 2015

(54) DECENTRALIZED CONTROL OF INTERFERENCE REDUCTION IN A WIRELESS COMMUNICATION SYSTEM

(75) Inventors: Ali Behravan, Stockholm (SE); David Astely, Bromma (SE); Yu Qian, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 384 days.

(21) Appl. No.: 13/257,607

(22) PCT Filed: Apr. 29, 2011

(86) PCT No.: PCT/SE2011/050541
§ 371 (c)(1),
(2), (4) Date: Sep. 20, 2011

(87) PCT Pub. No.: WO2012/148336
PCT Pub. Date: Nov. 1, 2012

(65) Prior Publication Data
US 2012/0314592 A1    Dec. 13, 2012

(51) Int. Cl.
*G01R 31/08* (2006.01)
*H04B 7/26* (2006.01)

(52) U.S. Cl.
CPC .................................. *H04B 7/2656* (2013.01)
USPC ........................................................ 370/252

(58) Field of Classification Search
CPC .................................................... H04B 7/2656
USPC ......... 370/277, 280, 326, 338, 321, 345, 442, 370/458–460, 252
See application file for complete search history.

(56) References Cited

U.S. PATENT DOCUMENTS

| | | | | |
|---|---|---|---|---|
| 5,832,368 A * | 11/1998 | Nakano et al. | ............... | 455/63.1 |
| 6,728,550 B1 * | 4/2004 | Bohnke et al. | ................ | 455/522 |
| 7,016,320 B1 * | 3/2006 | Petersson et al. | ............. | 370/331 |
| 8,077,694 B2 * | 12/2011 | Doss et al. | ..................... | 370/347 |
| 8,630,229 B2 * | 1/2014 | Himayat et al. | ................ | 370/328 |
| 8,687,514 B2 * | 4/2014 | Yamamoto et al. | ........... | 370/252 |
| 2008/0039131 A1 * | 2/2008 | Kaminski et al. | ............. | 455/522 |
| 2009/0073902 A1 * | 3/2009 | Astely et al. | .................. | 370/280 |

(Continued)

FOREIGN PATENT DOCUMENTS

WO    2008103090 A1    8/2008
WO    2008115105 A1    9/2008

*Primary Examiner* — Asad Nawaz
*Assistant Examiner* — Syed S Ali
(74) *Attorney, Agent, or Firm* — Coats & Bennett, PLLC

(57) ABSTRACT

A first base station (14) in a wireless communication system (10) operating according to a synchronised time division duplex scheme comprises an antenna (24), a radio communication unit (26) and an interference handling module (28). The interference handling module comprises an interference investigating unit (30) and a transmission control unit (34) configured to provide a sounding frame in which a variable downlink time interval has a pre-defined size long enough to provoke interference, order the interference investigating unit to obtain and analyse a link quality data parameter in a non-downlink time interval and determine whether interference from another base station is present. The transmission control unit is further configured to order the radio communication unit (26) to reduce the size of following variable downlink time intervals according to an interference reduction scheme for obtaining time intervals with a guaranteed reduced size if interference from another base station is present.

30 Claims, 9 Drawing Sheets

(56) References Cited

U.S. PATENT DOCUMENTS

| | | | |
|---|---|---|---|
| 2009/0213782 A1* | 8/2009 | Yee et al. | 370/321 |
| 2010/0097963 A1 | 4/2010 | Astely et al. | |
| 2010/0097964 A1* | 4/2010 | Astely et al. | 370/280 |
| 2010/0103892 A1* | 4/2010 | Abrahamsson et al. | 370/329 |
| 2010/0210214 A1* | 8/2010 | Pawar et al. | 455/63.1 |
| 2010/0246503 A1* | 9/2010 | Fox et al. | 370/329 |
| 2010/0246539 A1* | 9/2010 | Guillouard et al. | 370/336 |
| 2011/0002270 A1* | 1/2011 | Himayat et al. | 370/328 |
| 2011/0075624 A1* | 3/2011 | Papasakellariou et al. | 370/329 |
| 2011/0211560 A1* | 9/2011 | Yamamoto et al. | 370/332 |

* cited by examiner

DECENTRALIZED CONTROL OF INTERFERENCE REDUCTION IN A WIRELESS COMMUNICATION SYSTEM

TECHNICAL FIELD

The invention relates to interference between base stations in wireless communication systems. More particularly, the invention relates to a method and computer program product for handling interference in a wireless communication system operating according to a synchronised time division duplex scheme as well as to a base station in such a wireless communication system.

BACKGROUND

There are today many mobile communication systems that use synchronised time division duplex (TDD) schemes. One example of this is Time Division-Long Term Evolution (TD-LTE). These types of systems have certain message structures, such as frames or subframes provided after one another in time. The communications made in these systems, which involve base stations, each communicating in one or more cells, are usually synchronised with each other. The base stations in the different cells transmit signals in one period of time, often denoted downlink period, and receive signals in another period, often denoted uplink period. A TD-LTE frame contains 10 subframes with different arrangements of uplink and downlink subframes. A 2nd and a 7th subframe are denoted special subframes and include a downlink part DwPTS, a guard period GP and an uplink part UpPTS. The downlink and uplink parts (DwPTS and UpPTS) should be sufficiently separated from each other in order to avoid interference between uplink and downlink. If systems are synchronised this means that all base stations are transmitting at the same time and all are receiving at the same time.

One problem that has received increased attention lately in relation to systems using synchronised time division schemes are problems caused by atmospheric ducts.

An atmospheric duct is a horizontal layer that is created in the lower atmosphere, typically the troposphere. In such a duct the vertical refractive index gradients are such that radio signals (and light rays) are guided or ducted along the length of the duct. The radio signals in the ducts therefore tend to follow the curvature of the Earth. The radio signals also experience less attenuation in the ducts than they would if the ducts were not present.

The occurrences and locations of these ducts are hard to predict. They occur rarely, typically a few days or a number of hours in one year, and also often occur in some special area, like in the desert or near the sea.

For a mobile communication system, an atmospheric duct will cause downlink (DL) signals from far away base stations to travel through the atmosphere with long transmission delay but with a very low attenuation. This delayed but still strong signal may seriously affect TDD system performance.

Since the base stations in the above mentioned systems are supposed to transmit in well controlled periods of the frame structure and to receive signals from mobile stations in other periods of the frame structure, it is possible that the downlink signals from a base station travelling through an atmospheric duct will reach another base station when this other base station is supposed to receive signals from mobile stations, i.e. when this other base station is in uplink communication.

This situation can be serious because base stations transmit with much more power than a mobile station. Since the signals in the atmospheric duct have low attenuations, this means that a base station may not be able to receive any signals from mobile stations in the whole or parts of the uplink time assigned to reception of signals from mobile stations. This means that one of the fundamental base station functions may be impossible to perform.

It is also possible for a base station to interfere with uplink communication of another base station for other reasons, like if it has a faulty operation, like having lost its synchronisation or because a new base station has been added to the system.

There exist some prior art documents that discuss adjusting the frame structure based on interference.

US 2010/097964 describes how a central node controls the adapting of the duration of a guard period according to measured interference.

US 2010/097963 describes measuring of the interference level in a cell for part of the time between two consecutive down link periods and varying the duration of the first or second guard period, the duration of the up link period or the traffic sent in the up link period in accordance with the measured interference level.

WO 2008/115105 describes how base stations utilize time information from one of a number of synchronization sources in order to time the down link, up link and guard periods properly. A base station is here allowed to use information on the inaccuracy of a synchronization source of the base station in order to adapt its downlink periods so that it does not interfere with uplink periods in one or more other base stations.

WO 2008/103090 discloses measuring the interference level during part of the time between two consecutive down link periods and varying the duration of guard periods according to the interference level.

Most ways of reducing interference between base stations relies on a central node controlling the reduction or on information obtained from another source. It would however be of interest to obtain a way to reduce interference without having to involve a central node. The amount of communication can be extensive if a central node is employed. If many base stations experience interference, the communication network used may be slowed down. The central node may also take some time in determining the correct action. Furthermore the functionality may be lost in case the central node is defective, which will influence all base stations experiencing interference.

There is therefore a need for a solution to this problem.

SUMMARY

The invention is therefore directed towards providing decentralised control of interference from one base station to another in a mobile communication system that uses a synchronised time division duplex communication scheme.

One object of the invention is thus to solve the problem of providing decentralised control for limiting base station interference in a mobile communication system that uses a synchronised time division duplex communication scheme.

This object is according to a first aspect of the invention achieved through a method for handling interference in a wireless communication system operating according to a synchronised time division duplex scheme. The system has a frame structure where a frame comprises a downlink time interval of variable size and variable end position, an uplink time interval and a guard period between the downlink time interval and uplink time interval. This guard period has a size that is adaptive to the size of the downlink time interval and starts at the end position of the downlink time interval. The method is performed in a base station of the wireless communication system and comprises:

providing a sounding frame in which the downlink time interval has a pre-defined size that is long enough to provoke interference in another base station, measuring a link quality data parameter in a non-downlink time interval, determining based on the link quality parameter whether interference from another base station is present, and if, interference from another base station is present, performing the further steps of reducing the size of following variable downlink time intervals according to an interference reduction scheme for obtaining downlink time intervals with a guaranteed reduced size.

This object is according to second aspect of the invention achieved through a base station in a mobile communication system operating according to a synchronised time division duplex scheme. In the system there is a frame structure where a frame comprises a downlink time interval of variable size and variable end position, an uplink time interval and a guard period between the downlink time interval and uplink time interval. The guard period has a size adaptive to the size of the downlink time interval and starts at the end position of the downlink time interval. According to this second aspect the base station comprises:

at least one antenna, a radio communication unit for communicating with mobile stations of the system via the antenna, and an interference handling module comprising
  an interference investigating unit, and
  a transmission control unit being configured to provide a sounding frame in which the downlink time interval has a pre-defined size that is long enough to provoke interference in another base station,
    order the interference investigating unit to obtain and analyse a link quality data parameter in a non-downlink time interval and to determine, based on the link quality parameter, whether interference from another base station is present, and
    if interference from another base station is present, to order the radio communication unit to reduce the size of following variable downlink time intervals according to an interference reduction scheme for obtaining time intervals with a guaranteed reduced size.

The above-mentioned object is according to a third aspect of the invention achieved through a computer program product for handling interference in a wireless communication system operating according to a synchronised time division duplex scheme. The system uses a frame structure where a frame comprises a downlink time interval of variable size and variable end position, an uplink time interval and a guard period between the downlink time interval and uplink time interval. The guard period has a size adaptive to the size of the downlink time interval and starts at the end position of the downlink time interval. The computer program product comprises computer program code on a data carrier which when run on a processor forming an interference investigating module of a base station, causes the interference investigating module to:

provide a sounding frame in which the downlink time interval has a pre-defined size that is long enough to provoke interference in another base station, measure a link quality data parameter in a non-downlink time interval, determine based on the link quality parameter, whether interference from another base station is present, and if interference from another base station is present, further perform reducing the size of following variable downlink time intervals according to an interference reduction scheme for obtaining downlink time intervals with guaranteed reduced size.

The invention has many advantages. It removes the need for providing data communication about base station to base station interference in the system. The communication within the system is thereby not disturbed or hindered by interference reporting. It also removes the need for the use of a central decision making node, which speeds up the handling of interference and also makes the handling more reliable.

The system may be a time division duplexing system. It may also be a Universal Mobile Telecommunication System as well as a Long Term Evolution System.

According to one variation of the invention the method further comprises applying a default scheme in case no interference from another base station is present.

According to the same variation the transmission control unit may be further configured to allow the radio communication unit to apply a default scheme in case no interference is detected from another base station.

According to another variation of the invention, the provision of a sounding frame in the method comprises identifying the amount of data scheduled for transmission in the downlink time interval of variable size, adding additional data in case less than the maximum amount of data is scheduled for transmission and transmitting data in the downlink time interval of the sounding frame having the pre-defined size.

According to the same variation of the invention the interference handling module further comprises a data identifying unit. The transmission control unit, when providing a sounding frame, is then further configured to order the data investigating unit to identify the amount of data scheduled for transmission in the downlink time interval of variable size, to order the radio communication unit to add additional data in case less than the maximum amount of data is scheduled for transmission and to order the radio communication unit to transmit data in the downlink time interval of the sounding frame having the pre-defined size.

According to another variation, it is possible that the interference reduction scheme specifies that the guaranteed reduced size is a minimum size.

The non-downlink time interval may according to yet another variation comprise the uplink time interval.

According to this variation of the invention then it is possible that the step of measuring further comprises detecting the time duration of the interference in the uplink time interval and the reducing of the size of following variable downlink time intervals then comprises reducing the size to the first interference limiting size, where the first interference limiting size corresponds to the pre-defined size minus the time duration as detected.

According to the same variation of the invention the interference investigating unit may be further configured to detect the time duration of the interference in the uplink time interval, and the transmission control unit when being configured to order the radio communication unit to reduce the size of following variable downlink time intervals is configured to order the reduction to a first interference limiting size, where the first interference limiting size corresponds to the pre-defined size minus the time duration as detected.

This last variation may be further varied through determining, in the method and at regular predefined intervals between two consecutive sounding frames, whether residual interference is present and further reducing, if residual interference is present, the size of variable downlink time intervals with the time duration of the residual interference in the uplink time interval for obtaining variable downlink time intervals having a second interference limiting size.

The last variation may also be varied through the transmission control unit being further configured to order the interference investigating unit to determine, at regular predefined intervals of transmissions between two consecutive sounding frames, whether residual interference is present and to order the radio communication unit to reduce, if residual interference is present, the size of variable downlink time intervals with the time duration of the residual interference in the uplink time interval for obtaining variable downlink time intervals having a second interference limiting size.

In yet a further variation the interference reduction scheme specifies that the size of downlink time intervals with guaranteed reduced size is to be decremented each time residual interference from another base station is present in a non-downlink time interval between two sounding frames.

According to another variation of the invention the measuring of a link quality parameter in the method is performed in a non-downlink time interval of the sounding frame, the sounding frame is provided according to a sounding frame scheme and downlink time intervals with guaranteed reduced size are continued to be provided until transmission of a sounding frame is repeated.

According to the same variation of the invention the transmission control unit of the base station, when ordering the interference investigating unit, is configured to order this unit to obtain measurements of a link quality parameter in a non-downlink time interval of the sounding frame, configured to order the radio communication unit to transmit sounding frames according to a sounding frame scheme and when ordering the radio communication unit is further configured to order this unit to continue to provide downlink time intervals with guaranteed reduced size until transmission of a sounding frame is to be repeated.

According to yet another variation the method further comprises determining whether interference is present when the downlink time intervals have guaranteed reduced size and increasing the size of the downlink time interval if interference is present.

According to the same variation, the interference investigating unit may be further configured to investigate whether interference is present when the downlink time intervals have guaranteed reduced size and the transmission control unit may be further configured to order the radio communication unit to increase the size of the downlink time interval if interference is present.

In the last variation the increase may be an incremental increase of the size. It can also involve an increase to the maximum size.

According to a further variation of the invention, the provision of a sounding frame is triggered by the detection of interference.

The expression frame used in this application is intended to cover the expression subframe used in for instance LTE.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The present invention concerns a base station in a wireless communication system that may be a mobile communication system like Universal Mobile Telecommunication System (UMTS) and/or Long-Term Evolution (LTE). The system is furthermore a system that uses or operates according to a synchronised time division scheme, such as a time division duplexing system (TDD). In the example of LTE the system may be Time Division-Long Term Evolution (TD-LTE). It should be realized that the invention may be provided in other types of wireless communication systems using a synchronised time division duplex scheme.

Figure 1:
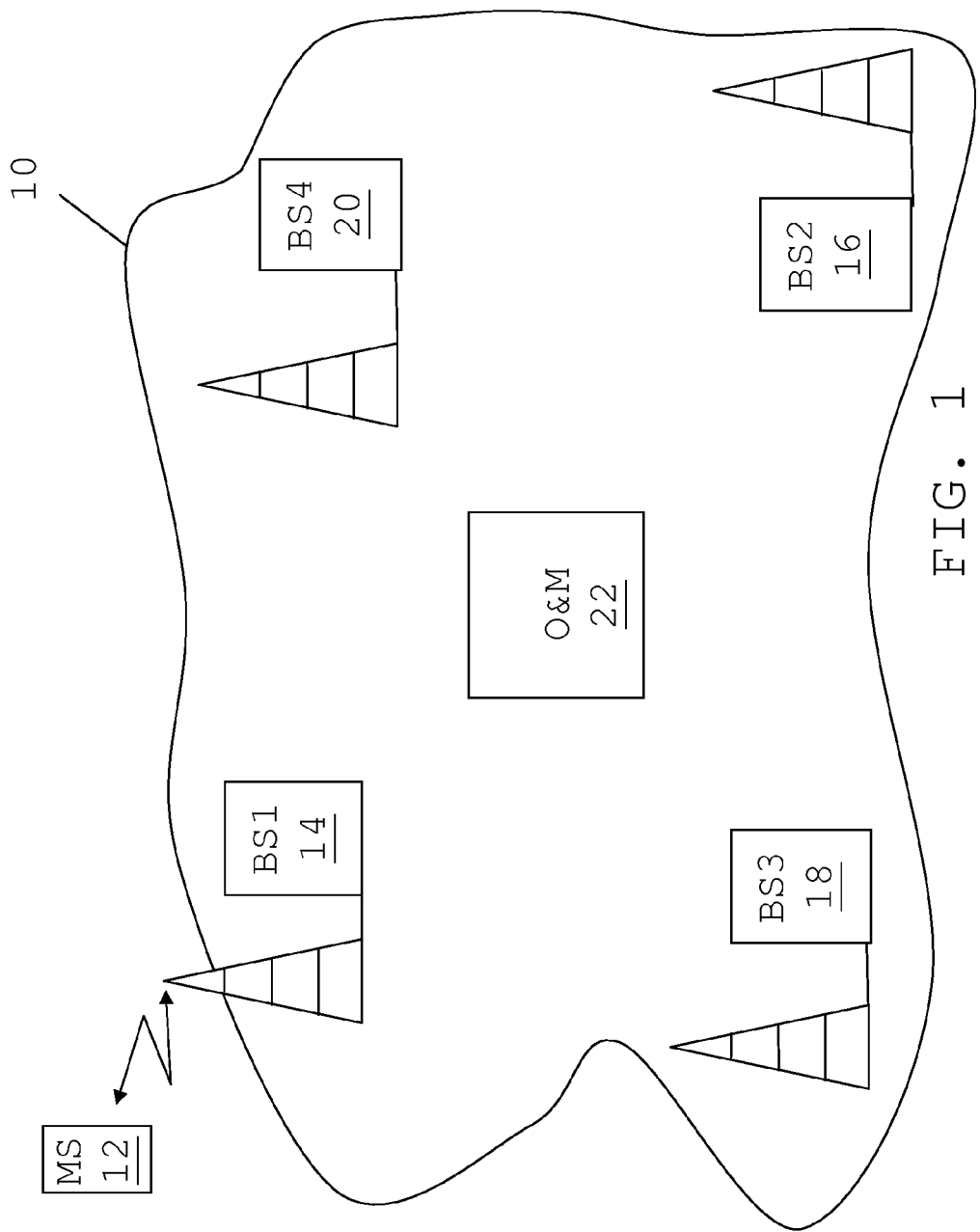
FIG. 1 schematically shows a wireless communication system comprising an O&M device and a number of base stations, where a first base station is communicating with a mobile station.

FIG. 1 schematically shows one exemplifying TD-LTE system 10. In this system there are a number of base stations 14, 16, 18 and 20. Base stations are in mobile communication systems often denoted node B's and in LTE evolved node B's (enodeB). There is here a first base station 14, a second base station 16, a third base station 18 and a fourth base station 20. The second base station 16 is provided on a long distance from the first base station 14. Also here the third and fourth base stations 18 and 20 are provided on a long distance from the first base station 14. Because of the long distance between the first and the second base station 14 and 16, the transmissions of the second base station 16 would under normal atmospheric situations be attenuated enough for not influencing the operation of the first base station. The same situation would under normal circumstances also be true for the second base station 16, i.e. the first base station 14 would normally not interfere the operation of the second base station 16. The third and fourth base stations 18 and 20 are here likewise base station that are provided on long distances from the first base station 14 and there would also in this case normally not be any interference between the first base station 14 and the third and fourth base stations 18 and 20 and vice versa. In FIG. 1 there is furthermore shown an Operations and Maintenance (O&M) device 22, with which all of the base stations may communicate. This device is a part of an O&M subsystem in the mobile communication system. The operations and maintenance device 22 is a central node in the system that is a node which could be used to control all activities in the system concerning base stations interfering each other. Finally, the first base station 14 is here shown as communicating with a mobile station MS 12.

Figure 2:
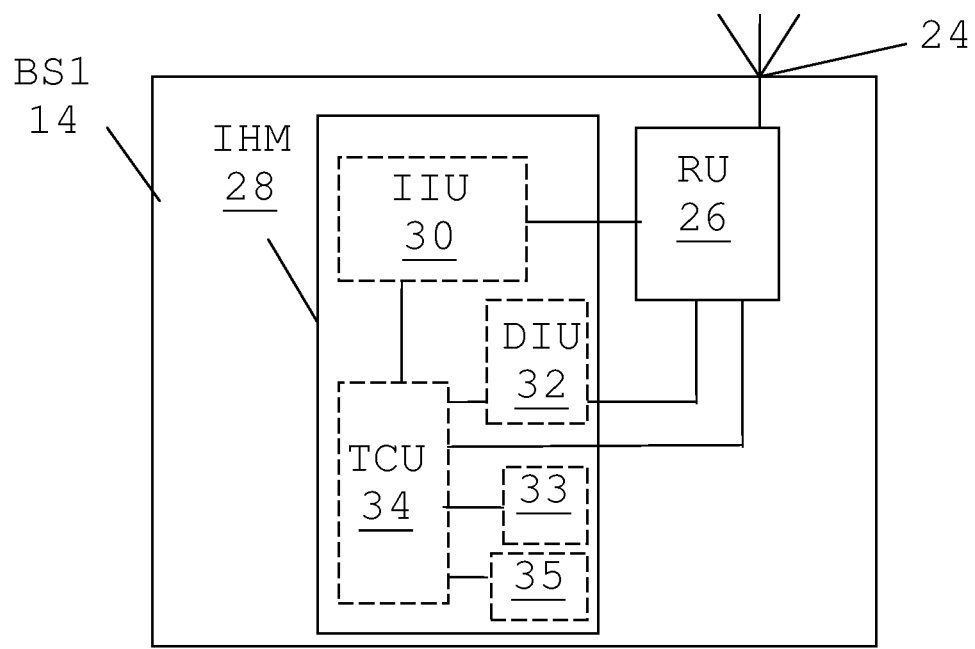
FIG. 2 shows a block schematic of the first base station, FIG. 3 schematically shows an atmospheric duct having been formed in the atmosphere above the earth, FIG. 4 schematically shows a part of the frame structure used in the system.

FIG. 2 shows a block schematic of the first base station 14. The first base station 14 comprises a radio communication unit RU 26 connected to at least one antenna for communicating with mobile stations of the system like the one shown in FIG. 1. In the example in FIG. 2 there is only one antenna 24. The first base station 14 furthermore comprises an interference handling module IHM 28. The interference handling module 28 comprises a number of units. It includes an interference investigating unit IIU 30, a data identifying unit DIU 32 and a transmission control unit TCU 34. The interference investigating unit 30 is here connected to the radio communication unit 26 as well as to the transmission control unit 34, which in turn is further connected to the data identifying unit 32 and to the radio communication unit 26. The transmission control unit is also connected to a frame counter 33 and to a adjustment counter 35. Finally the data identifying unit 32 is also connected to the radio communication unit 26.

Figure 3:
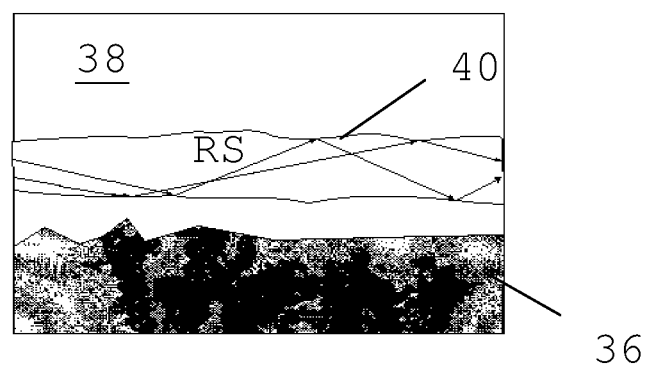

As was mentioned earlier there can at times occur atmospheric ducts in the atmosphere. Such a situation is schematically shown in FIG. 3, which shows an atmospheric duct 40 that has been created in the atmosphere 38 above ground 36. In FIG. 3 there is also shown how radio signals RS propagate in this duct along the length of the duct. Radio signals RS that are transported in this duct 40 can be propagated long distances with low attenuation.

As mentioned earlier, the system is a Time Division Duplex communication system. This means that the base stations communicate synchronised with each other in the frame structure of the system.

Figure 4:
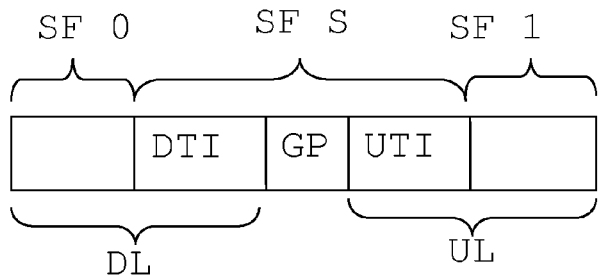

FIG. 4 schematically shows a part of the frame structure used by the base stations. In the part of a structure shown in FIG. 4 there is a subframe zero SF 0 followed by a special subframe SF S and a subframe one SF 1. All these subframes are divided into time slots. Subframe zero SF 0 is here only provided for downlink communication DL, i.e. communication from base station to mobile station, and subframe one SF 1 only for uplink communication UL, i.e. communication from mobile station to base station. The special subframe SF S is here shown as comprising three time intervals, a downlink time interval DTI, a guard period GP and an uplink synchronisation time interval UTI. The downlink time interval is a downlink time interval with variable size and variable end position. This means that the downlink time interval has a size that may vary, based on the needs of the base station, in an allowed size range between a maximum size and a minimum size. In LTE this downlink time interval is furthermore denoted Downlink Pilot Time Slot (DwPTS). The uplink time interval is in LTE denoted Uplink Pilot Time Slot (UpPTS). In the guard period GP no transmissions are supposed to be made. This period is used for providing a sufficient separation between transmission and reception in the system in order to avoid interference. The guard period GP is thus an interval between uplink and downlink transmissions. The guard period is provided for handling problems with the synchronisation and has a size that is adaptive to the size of the downlink time interval as well as to the uplink time interval. It furthermore starts at the end of the variable size downlink time interval and ends at the beginning of the uplink time interval.

The base stations all use this frame structure. As the transmissions of the base stations are synchronised with each other, the downlink time intervals are transmitted simultaneously by all base stations.

Atmospheric ducts, like the one shown in FIG. 3 may appear between the first base station 14 and the second base station 16. This means that the radio signals of the second base station may be lead via this duct 40 to the first base station 14. Also the signals of the first base station 14 may be led to the second base station 16 via the duct 40. In this case the transmissions of the second base station 16 may be delayed in relation to the transmissions of the first base station 14 so that transmissions of the second base station may be received by the first base station in the uplink section of a frame.

Figure 5:
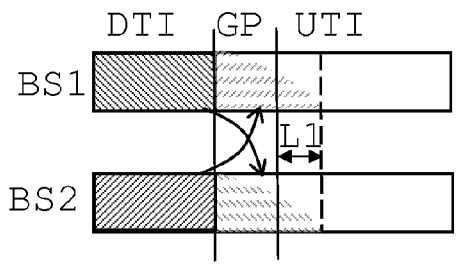
FIG. 5 shows the interference that two base stations cause to each other when transmitting in sounding frames.

FIG. 5 shows the special subframe used by the first and the second stations BS1 and BS2 and the influence caused by the atmospheric duct. As can be seen the subframes appear at the same points in time. In this example the sizes of the downlink time intervals DTI are furthermore the same. In the figure there is also indicated how the transmissions of the second base station BS2, although being ended at the end of the downlink time interval DTI, gives rise to interference that stretches through the guard period GP and into the uplink time interval UTI of the special subframe of the first base station BS1. The figure also shows how the transmissions of the first base station BS1 gives rise to interference that stretches through the guard period GP and into the uplink time interval UTI for the second base station BS2. Finally FIG. 5 shows the time spread L1 of the interference, which is the duration of the interference in the uplink time interval.

As can be seen in FIG. 5 the downlink transmissions of the second base station interfere the uplink transmissions to the first base station 14 and vice versa when there is an atmospheric duct. This means that the first base station 14 will receive radio signals from the second base station 16 when it is in fact supposed to receive radio signals from the mobile stations in its vicinity, like the mobile station 12. A base station transmits with a lot more power than a mobile station. This therefore means that due to the low attenuation of the transmissions of the second base station 16 in the duct, these transmissions will make it more or less impossible for the first base station 14 to be able to receive any radio signals from the mobile stations, like mobile station 12. The interference from the second base station 16 will be too high. As the transmissions of the first base station 14 in the same way reaches the second base station 16 with a delay, also the second base station 16 will in the same way experience the same type of interference from the first base station 14. It can here furthermore be mentioned that it is also possible to be interfered during uplink communication by another base station if this other base station is faulty, like if it has lost its synchronisation. These situations do therefore have to be addressed.

The logical way of dealing with this problem would be to have functionality in a central node of the system for handling such interference, such as in the O&M node 22, which has functionality for identifying base stations based on cell identifiers. However, if control of interference is to be handled centrally and if it is possible to identify the interferer uniquely, a number of further issues may have to be considered The amount of communication can be extensive if a central node is employed. If many base stations experience interference, the communication between network nodes in the system may be slowed down when many base stations report interference. The central node may also take some time in determining the correct action because of the many base stations reporting interference. Furthermore, in case the central node is defective, the interference limiting functionality will be affected for all base stations.

As can therefore be seen it is of interest to provide a decentralised handling of base station to base station interference, for instance caused by atmospheric ducts.

The invention is provided for addressing this situation. The invention is therefore directed towards allowing base stations to handle interference reduction themselves, without the need to provide additional communication with a central node or even with the other base station. This simplifies and speeds up the handling of such situations. It also makes the handling of interference more robust.

The invention uses the fact that there is reciprocity in interference between base stations. The invention is also based on the notion that in order to determine if a base station is interfered it should be transmitting for providing the highest possible probability of interfering the other base station in the above mentioned frame structure. If the other base station operates in the same way, both may then clearly detect that they are in fact experiencing interference from each other. Based on this they can then perform appropriate countermeasures. This type of transmission with the highest possible probability for interfering is here made in a so-called sounding frame. A sounding frame in the frame structure is a frame in which interference investigations are being made or initiated. The structure of a sounding frame will be described shortly.

Figure 6:
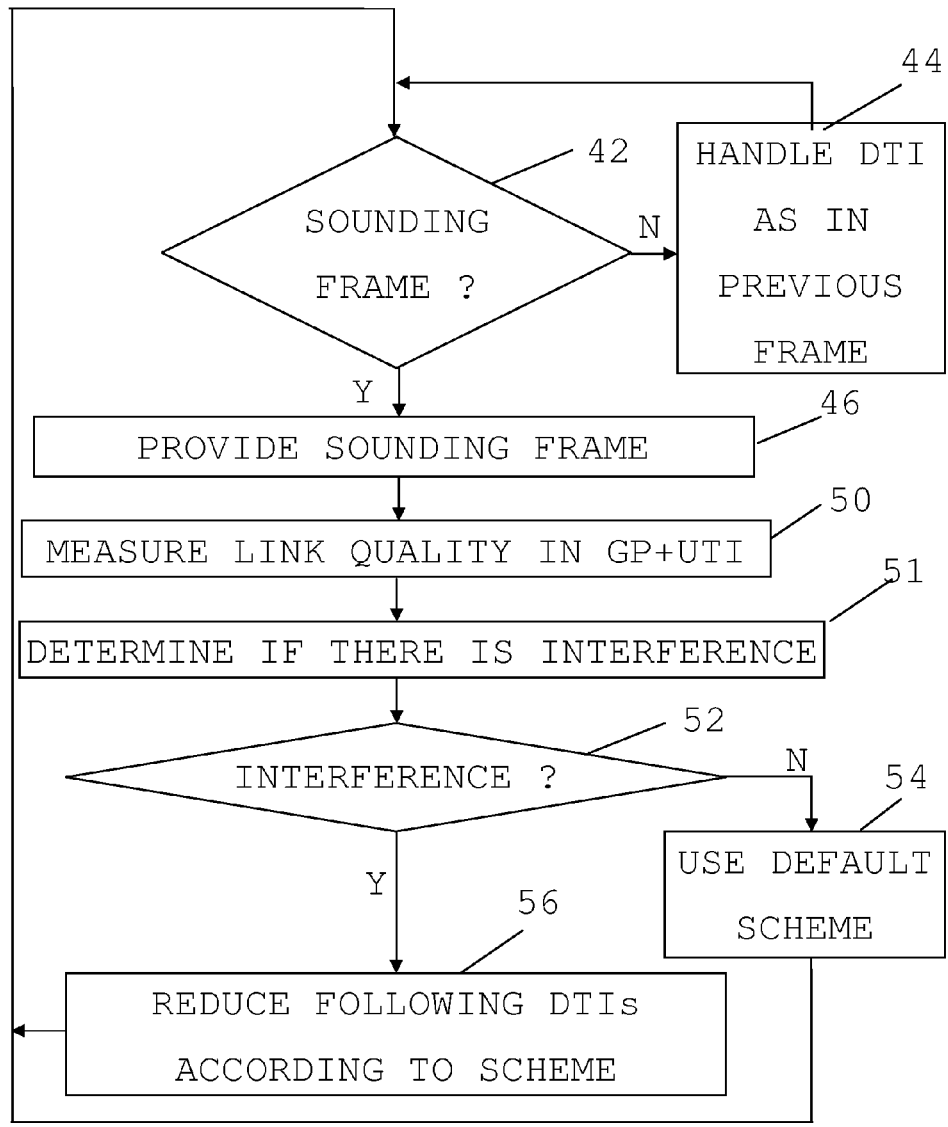
FIG. 6 shows a flow chart of a general method for handling interference in a mobile communication system according to a first embodiment of the invention being performed in the first base station, FIG. 7 schematically shows a communication used according to some variations of the invention where there is a regularly recurring sounding frame.

A first embodiment of the invention will now be described with reference being made to the previous figures as well as to FIG. 6, which shows a flow chart of a general method for handling interference in a wireless communication system according to a first embodiment of the invention.

In the first embodiment the method starts with the transmission control unit 34 of the first base station 14 investigating if a sounding frame is to be transmitted. A sounding frame may for instance be transmitted according to a sounding frame transmission scheme or because interference is detected. If no sounding frame is to be transmitted, step 42, then the downlink time interval is handled in the same way as in a previous frame, step 44. How this is handled is based on a previous sounding frame and investigations performed in relation to this previous sounding frame. In case these previous investigations resulted in the application of an interference reduction scheme, then this scheme would be continued to be applied. If not the downlink time interval may be handled according to a default scheme. If a sounding frame is to be transmitted, step 42, then the transmission control unit 34 provides a sounding frame, step 46, in which the variable downlink time interval DTI has a pre-defined size that is long enough to provoke interference in another base station. In the following the pre-defined size will be described as being the maximum size. However, other pre-defined sizes are possible. The transmission control unit 34 thus guarantees that the variable downlink time interval DTI has the maximum size in this sounding frame, step 46. This means that data is transmitted in the downlink time interval of the sounding frame having the maximum size. This may also involve the transmission control unit 34 ordering the radio communication unit 26 to transmit data in the downlink time interval DTI of the frame. Thereafter the transmission control unit 34 orders the interference investigating unit 30 to obtain and analyse a link quality data parameter in a non-downlink time interval, which non-downlink time interval may be the guard period and the uplink time interval UTI. However, it may as an alternative be only the uplink time interval. The investigation may here be performed in the sounding frame or in a following frame. The interference investigating unit 30 then measures, via the radio communication unit 26, the link quality data parameter in the non-downlink time interval, step 50, which data provides information of interference levels.

Now, since communication in the system is supposed to be synchronised there should be no interference from other base stations in the uplink time interval UTI and perhaps not also in the guard period GP. The interference investigating unit 30 then determines, based on the link quality measurements, whether interference from another base station is present, step 51. If the interference investigating unit 30 does not detect such interference, i.e. if there is no interference present from another base station, step 52, it informs the transmission control unit 34 of this fact, and the transmission control unit 34 applies the default scheme, step 54.

In case there is a low attenuation duct in the atmosphere, the transmissions of the second base station will due to propagation be received at the first base station with a considerable delay and vice versa. The delay will cause energy to spill over into the guard period GP and uplink time interval UTI of the first base station, and vice versa, something which is shown in FIG. 5.

Therefore interference will be detected when measuring link quality to mobile stations in the uplink.

Thus, in case the interference investigating unit 30 does detect interference in the non-downlink time interval, i.e. in case interference is present, step 52, it informs the transmission control unit 34 of this fact and the transmission control unit 34 goes on and reduces the size of following variable downlink time intervals according to an interference reduction scheme in order to obtain downlink time intervals with a guaranteed reduced size, step 56. It thus reduces the size of the variable downlink time interval after the sounding frame. Thereafter the transmission control unit 34 again investigates if a sounding frame is to be transmitted and if not, step 42, continues transmitting downlink time intervals DTI with a size set according to the principles used in the previous frame, step 44, which in this case is a downlink time interval DTI, the size of which has been reduced according to the scheme. In case a sounding frame is to be transmitted, this is then repeated, i.e. a downlink time interval DTI with guaranteed maximum size is transmitted.

In this way the transmission control unit 34 continues to operate in order to handle interference from other base stations.

It can here be seen that a sounding frame is a frame where the downlink time interval normally has the maximum size and consequently the guard period normally has the minimum size. It can therefore be seen that a sounding frame may guarantee the smallest possible guard period. This means that if a strong interferer is present at a large distance from the base station, where this interferer may be the second base station, then power from the interferer will be present in the guard period GP and the following Uplink Time Interval.

The invention here uses reciprocity and the fact that both base stations operate in the same way. The act of reducing the downlink time interval DTI performed by the first base station has no effect on the interference it itself experiences. However, this time interval reduction does reduce the interference experienced by the second base station. If now the second base station operates in the same way, it will experience the same delay and amount of power from the first base station, and be triggered to reduce the size of its own downlink time interval DTI and therefore the interference experienced by the first base station will also be reduced. Interference is in this way reduced in both base stations.

Figure 7:
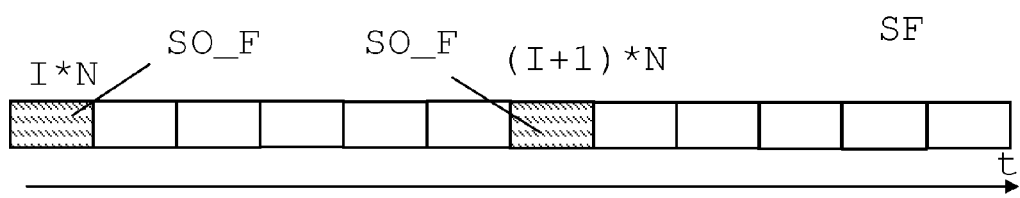
Figure 8:
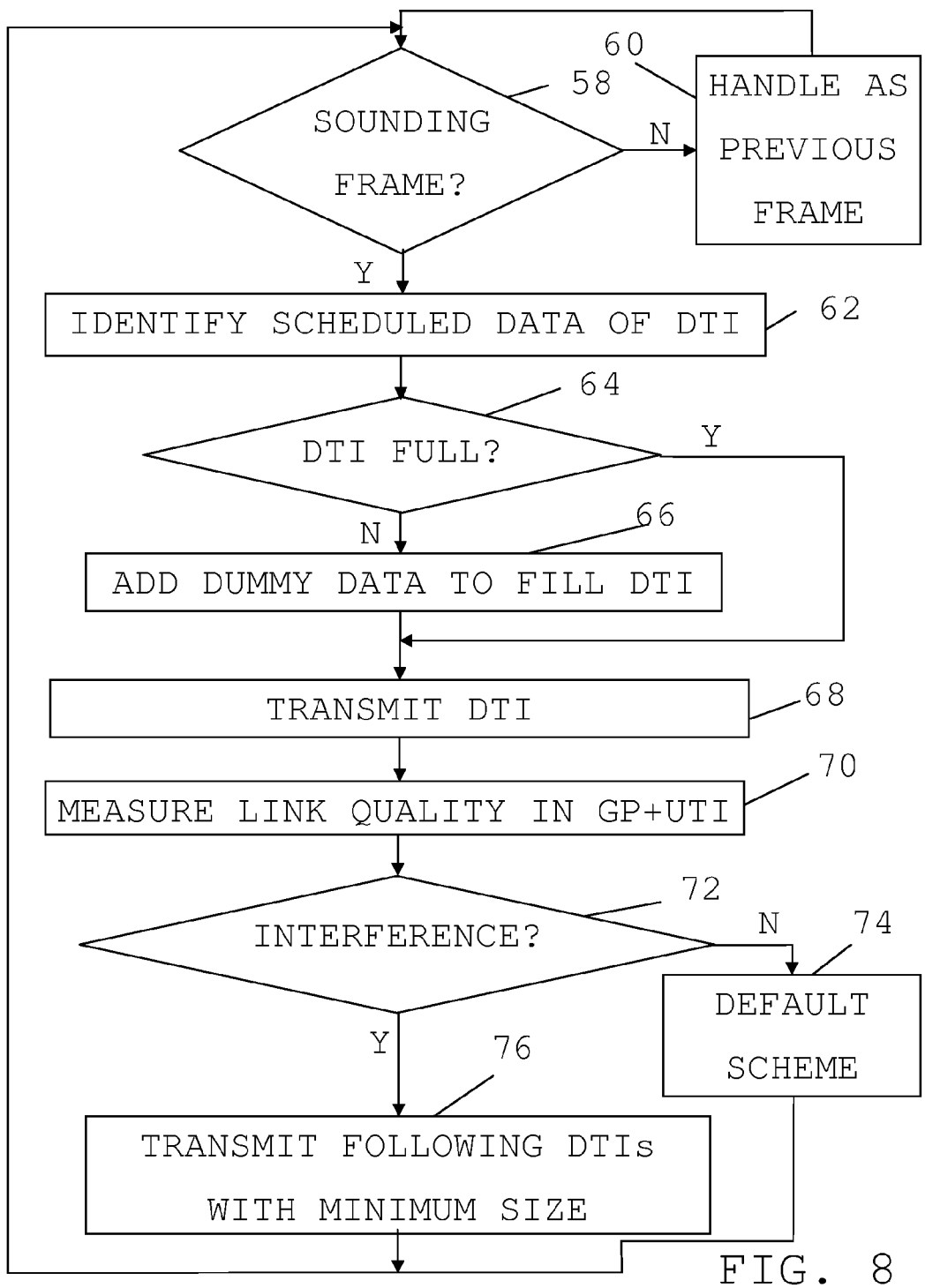
FIG. 8 shows a flow chart of a method of handling interference in the first base station according to a second embodiment of the invention, FIG. 9 schematically shows the structure of FIG. 9 to which additional regularly recurring investigation frames have been added.

After having described this first general embodiment, a second more specific embodiment will now be described with reference being made to FIGS. 1-5 as well as to FIG. 7, which shows a communication structure of the system where there is a regularly recurring sounding frame SO_F providing a downlink time interval with guaranteed maximum size and also where an interference investigation is performed, and to FIG. 8, which shows a flow chart of the method of handling interference in the first base station according to the second embodiment of the invention.

In this embodiment, the base stations synchronize their transmission timings and apply a sounding frame scheme specifying that sounding frames are repeated with a repetition rate 1/N, which repetition rate 1/N is used by all base stations in the system. This means that in this second embodiment all base stations transmit a sounding frame at the same point in time. There is thus a sounding frame at a position in a super frame SF and N frames later a further sounding frame SO_F is provided. The first sounding frame may therefore be considered as being provided at a frame position I*N in the superframe SF and the following sounding frame SO_F at a frame position (I+1)*N of the superfame.

As in the first embodiment, this second embodiment starts with the transmission control unit 34 investigating if a frame to be transmitted according to the sounding frame scheme is a sounding frame SO_F. In order to do this it may employ the frame counter 33 that may have an initial value of zero or N, which counter is incremented or decremented for each frame being transmitted. When the frame counter 33 has been run through N times, either through the counter value having reached the value of N or zero, then it is time for a new sounding frame. In case no sounding frame is to be provided, step 58, the transmission control unit 34 handles the frame as a previous frame, step 60, which may be according to a default handling scheme or according to an interference reduction scheme that is employed based on the result of a previous sounding frame. If however, the frame is to be a sounding frame, step 58, the transmission control unit 34 provides this sounding frame through ensuring that the downlink time interval DTI has the maximum size.

In this second embodiment this is done through the transmission control unit 34 ordering the data identifying unit 32 to identify data scheduled for transmission in the downlink time interval DTI, step 62, which may be done through the data identifying unit 32 investigating the radio communication unit 26. The data investigating unit 32 then informs the transmission control unit 34 of the results. In case the interval will be full, step 64, the transmission control unit 34 then orders the radio communication unit 26 to transmit the downlink time interval DTI in its present form, step 68. However, if it will not be, i.e. the communication needs of the first base station 14 do not require an interval of the maximum size, step 64, the transmission control unit 34 provides the radio communication unit 26 with dummy data in order to fill the downlink time interval DTI to the maximum size. The transmission control unit 34 thus adds dummy data to fill the downlink time interval DTI, step 66, whereupon transmission of the downlink time interval DTI is made by the radio communication unit 26, step 68. As this has been done the interference investigating unit 30 measures link quality in the guard period GP and uplink time interval UTI, step 70, which is here done in the sounding frame, i.e. in the same frame in which a full downlink time interval DTI was guaranteed.

If then interference is present or detected, step 72, then the transmission control unit 34 employs a first interference reduction scheme. This first scheme specifies that the minimum downlink time interval is to be used. The transmission control unit 34 thus orders the radio communication unit 26 to transmit following downlink time intervals with the minimum size, step 76. As before if no interference is present or detected, then the default scheme may be used, step 74.

Thereafter the transmission control unit 34 returns and investigates whether the next frame is a sounding frame SO_F, and if it is not, step 58, then the downlink time interval DTI is handled as in the previous frame, i.e. as set out based on the investigations made in the sounding frame, with a minimum size or according to t default scheme.

As in the first embodiment, the second base station 16 operates in the same way. This means that as the first base station 14 detects interference also the second base station 16 detects interference and changes the size of the downlink time interval DTI. They thus both provide downlink time intervals with guaranteed reduced size, which is here the minimum size. Furthermore, they continue to provide frames with downlink time intervals having this guaranteed reduced size until a sounding frame is again to be transmitted, i.e. until the transmission of a sounding frame is repeated. This means that the guard period GP will be expanded and the downlink time interval DTI reduced. The consequence is that the interference seen in FIG. 5 will be moved to the left and consequently not harm the uplink communication in the uplink time interval UTI. This means that by this operation the first base station 14 will change its downlink time interval DTI so that this interval will not interfere with the uplink communication of the second base station 16 and the second base station 16 will change its downlink time interval DTI so that it will not interfere with the uplink communication of the first base station 14.

This second embodiment has the advantage of being fast, effective and easy to implement.

Figure 9:
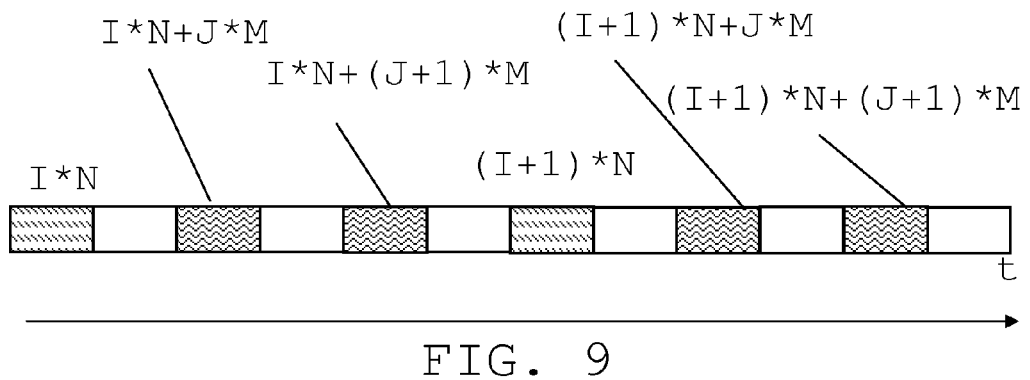
Figure 10:
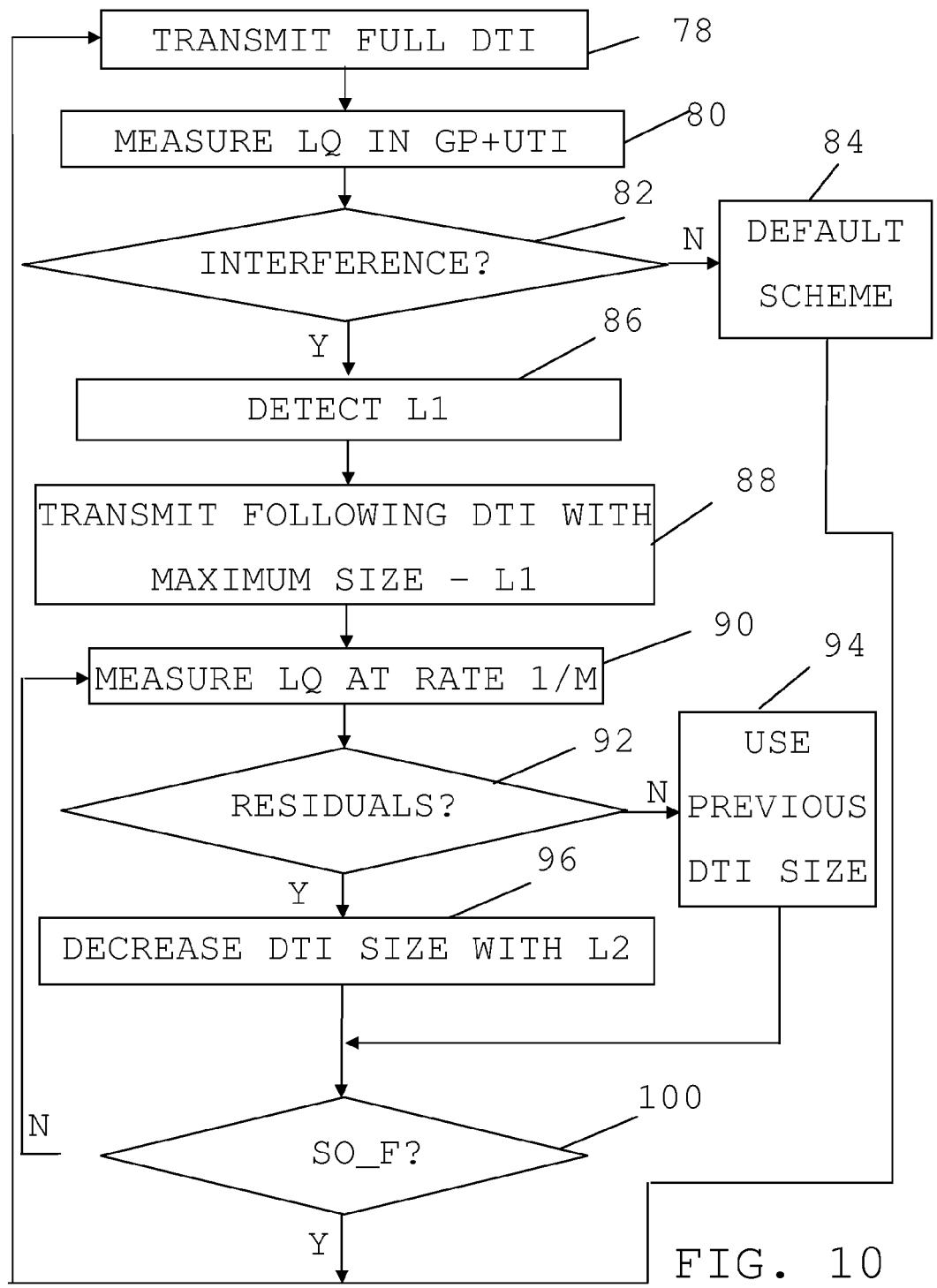
FIG. 10 shows a flow chart of a method of handling interference in the first base station according to a third embodiment of the invention.

A third embodiment of the invention will now be explained with reference being made to FIGS. 9 and 10 instead of to FIGS. 6 and 8, where FIG. 9 shows the structure of FIG. 7, however further comprising regularly recurring frames where further interference investigations are performed, and FIG. 10, which shows a flow chart of a method of handling interference in the first base station according to the third embodiment of the invention.

As in the second embodiment, this third embodiment starts with the transmission control unit 34 investigating if there is to be transmitted a sounding frame according to the rate 1/N. In order to do this it use the frame counter 33, which counter is incremented or alternatively decremented for each frame. When the frame counter 33 has been run through N times, then it is time for a sounding frame.

In case there is to be transmitted a sounding frame, then the transmission control unit 34 provides this sounding frame via a maximum size downlink time interval, i.e. through guaranteeing or ensureing that a full downlink time interval DTI is transmitted, step 78, which is done in the same way as before. This is followed by the interference investigating unit 30 measuring link quality in the guard period GP and uplink time interval UTI, step 80, which is also here done in the sounding frame SO_F, i.e. in the same frame in which a full downlink time interval DTI was guaranteed.

If interference is not detected, step 82, then the default scheme is applied, step 84, until it is again time to transmit a sounding frame, step 78.

However, if interference is detected, i.e. interference is present, step 82, then the transmission control unit 34 employs a second interference reduction scheme. In this second scheme the transmission control unit 34 orders the interference investigating unit 30 to detect the time spread L1 of the interference, i.e. the time duration of the interference in the uplink time interval UTI. The interference investigating unit 30 then detects this time spread L1, step 86, and informs the transmission control unit 34. According to this second scheme, the transmission control unit 34 then determines a first interference limiting size for the variable downlink time interval DTI. The first interference limiting size is here the maximum variable downlink time interval size minus said time spread L1 as detected. The transmission control unit 34 then orders the radio communication unit 26 to transmit the following downlink time interval DTI with the first interference limiting size, i.e. with the pre-defined size, here the maximum size, minus the time spread L1, step 88. This means that the downlink time interval DTI of the first frame after the sounding frame SO_F is reduced from the maximum size to the first interference limiting size. This also means that the size is not allowed to be larger than the first interference limiting size. However, it is possible that it may be smaller.

As this is done, the transmission control unit 34 increments or decrements the frame counter 33. However, it also starts an adjustment counter 35 set to increment or decrement each time there is a new frame.

Each time the investigation counter 35 has been counting M times, i.e. reached a value M or zero, it is time for further investigations. This means that the adjustment counter 35 determines a further investigation rate 1/M. Here this further investigation rate 1/M is higher than the sounding frame rate 1/N. This also means that the further investigation rate 1/M sets out that the further interference investigations are performed at regular predefined intervals between two consecutive sounding frames. This is indicated in FIG. 9, through further interference investigations being performed in frames I*N+J*M and I*N+(J+1)*M between a first and a second sounding frame I*N and (I+1)*N and further investigations being performed in frames (I+1)*N+J*M and (I+1)*N+(J+1)*M after the second sounding frame (I+1)*N, where I, J, N and M are integers and I and J are values indicating how many times the value N and M, respectively, is being reached.

At the time of such a further investigation according to this further investigation rate 1/M, i.e. when the adjustment counter 35 has counted M times, the interference investigating unit 30 performs link quality measurements in the uplink time interval, step 90, and forwards the result of the investigations to the transmission control unit 34. The transmission control unit 34 then investigates if there is any residual interference when using the first interference limiting size. If there is not, step 92, then the previous downlink time interval size is used, i.e. the first interference limitation size, step 94, and the frame counter 33 and the adjustment counter 35 incremented or decremented every time a frame is transmitted until either of them have counted the set number of times. In the frames transmitted as this is done, the previously determined first interference limiting size is used.

However, if there were residuals, step 92, i.e. if there was still residual interference in the uplink time interval UTI then the downlink time interval size is further decreased to a second interference reduction size, step 96. This size is as an example the first interference limitation size being decreased by the time spread L2 of the residual interference, i.e. the time duration of the residual interference in the uplink time interval UTI. This means that here the transmission control unit 34 may order the interference investigating unit 30 to detect the spread L2 of the residual interference and to control the decrease of the downlink time interval size based on the result. Thereafter the frame counter 33 and adjustment counter 35 continue to count until any of them have reached the corresponding set limit, i.e. until either the frame counter 33 has been counting N times and thus incremented the value I or the adjustment counter 35 has been counting M times and incremented the value J. As the counters 33 and 35 are operated in this way the downlink time interval of the frames has the second interference limiting size.

The transmission control unit 34 then investigates which counter has been counting the requisite number of times. The transmission control unit 34 thus investigates if it is time for a full downlink time interval DTI, i.e. if it is time for a new sounding frame SO_F or for a further investigation. In case a new sounding frame is to be repeated, step 100, then a full downlink time interval DTI is again transmitted, step 78, while if it is not, then the link quality is measured, step 90, followed by investigating of further residuals, step 92.

As before, also here it is assumed that also the second base station follows the same type of operation. This means that as the first base station detects interference and interference residuals and changes downlink time interval size also the second base station will detect interference and interference residuals and change the downlink time interval size. Furthermore, both base stations provide downlink time intervals with guaranteed reduced size, which is here initially the first interference limitation size and then possibly the second interference limitation size. Furthermore, they continue to provide frames with downlink time intervals having a guaranteed reduced size until a sounding frame is again to be transmitted. This means that the guard period will be increased and the downlink time interval DTI reduced.

Here the decrease of the variable downlink interval is made in two steps in order to enable more efficient use of the downlink time interval, where a first size decrease is later adjusted in case it was not sufficient.

It is possible with other types of schemes where the changes of the variable downlink time interval are even less drastic in order to allow an even better use of the downlink time interval.

Figure 11:
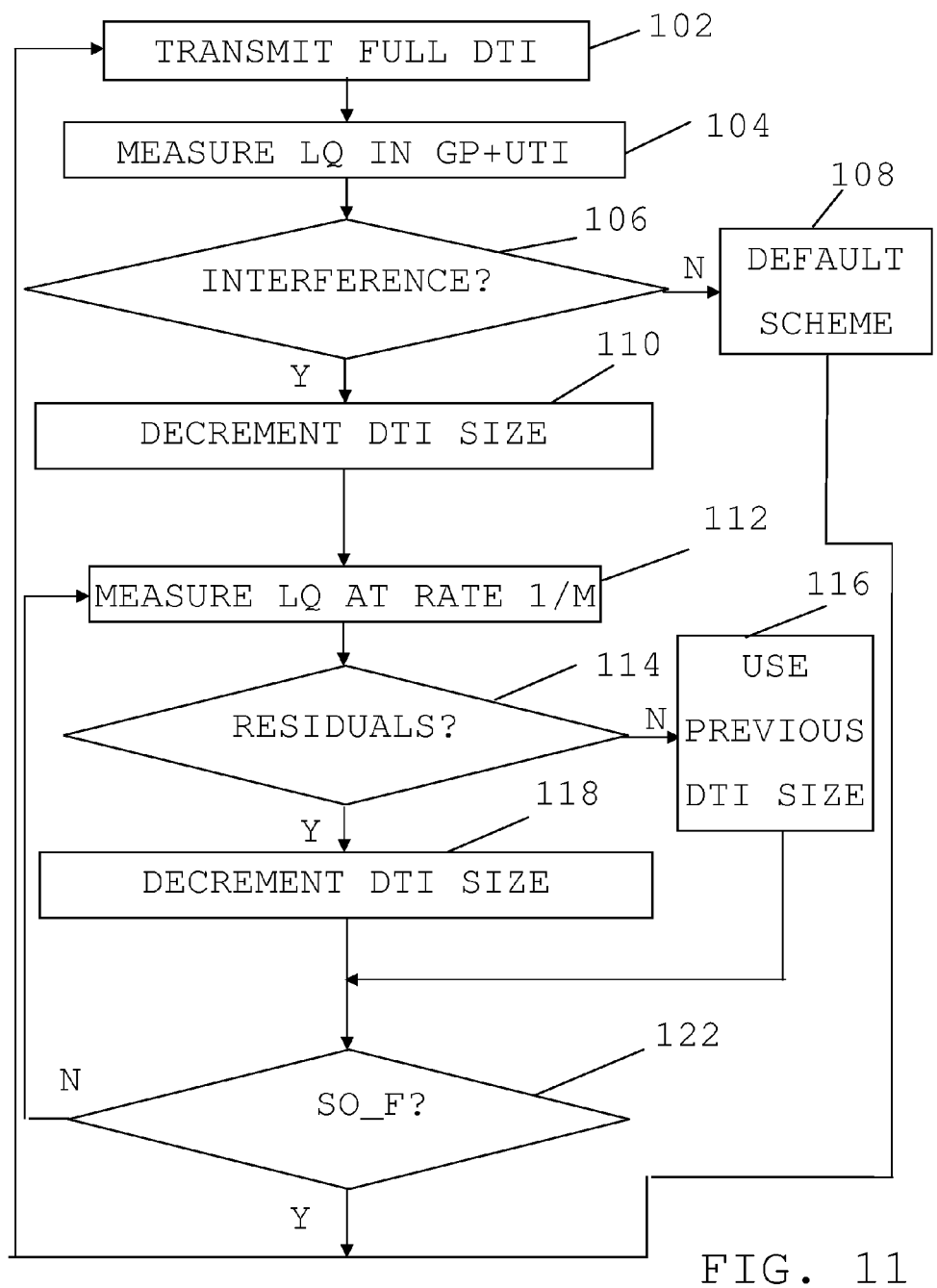
FIG. 11 shows a flow chart of a method of handling interference in the first base station according to a fourth embodiment of the invention.

A fourth embodiment directed towards this situation will now be described with reference being made to FIG. 11, which shows a flow chart of a method of handling interference in the first base station according to a fourth embodiment of the invention.

As in the third embodiment, this fourth embodiment starts with the transmission control unit 34 investigating if the next frame to be transmitted according to a predefined sounding frame transmission scheme is a sounding frame. The determination may also here be done using the frame counter 33. When the frame counter 33 has been run through N times then it is time for a sounding frame.

In case there is to be transmitted a sounding frame, then the transmission control unit 34 guarantees or ensures that a full downlink time interval DTI is transmitted, step 102, which is done in the same way as before. This is followed by the interference investigating unit 30 measuring link quality in the guard period GP and uplink time interval UTI, step 104, which is also here done in the sounding frame, i.e. in the same frame in which a full downlink time interval DTI was guaranteed.

If interference is not detected, step 106, then the default scheme is used, step 108, until it is again time to transmit a sounding frame, step 102.

However, if interference is detected, step 106, then the transmission control unit 34 here employs a third interference reduction scheme. This third scheme is based on the variable downlink time interval being variable in equally sized steps from the maximum size to the minimum size. More particularly the third scheme specifies that the size of downlink time intervals with guaranteed reduced size is to be decremented after detecting residual interference. Therefore the transmission control unit 34 decrements the downlink time interval size from the maximum size, step 110, i.e. it diminishes the size by one step, and orders the radio communication unit 26 to transmit the following downlink time interval with this size. As this is done, the transmission control unit 34 increments or decrements the frame counter 33 and also starts the adjustment counter 35 and when the latter has been counting M times, this counter 35 triggers the further interference investigation just as in the third embodiment, i.e. it triggers the measuring of link qualities at the rate 1/M, step 112.

At the time of a further investigation, the interference investigating unit 30 performs link quality measurements in the uplink time interval, step 112, and forwards the result of the investigations to the transmission control unit 34. The transmission control unit 34 then investigates if there is any residual interference and the investigation is thus made when the base station uses the guaranteed reduced size of the downlink time interval. If there is no residual interference, step 114, then the previous downlink time interval size is used, step 116, and the frame counter and adjustment counter operated until either of them reaches the set value. In the frames transmitted as this is done, the previously determined downlink time interval size is used.

However, if there were residuals, step 114, then the downlink time interval size is further decremented, step 118. Thereafter the frame counter 33 and adjustment counter 35 are operated until either of them reach their set value 0 or N, or 0 or M, respectively. While this is done, the downlink time intervals have the latest determined interference limitation size.

The next time that the adjustment counter 35 or frame counter 33 has reached its set value, the transmission control unit 34 investigates if it is time for a full downlink time interval, i.e. if it is time for a new sounding frame, or for a further investigation. In case a new sounding frame is to be repeated, step 122, then a full downlink time interval DTI is again transmitted, step 102, while if it is not, then the link quality is measured at the rate 1/M, step 112, followed by investigating of further residuals, step 114.

The advantage of this embodiment is that the size of the variable interval is not made any smaller than necessary.

The above described embodiments thus make sure that the first and second base stations do not interfere with each other.

There is a further problem in that there may be more atmospheric ducts. This means that the first base station 14 may, in addition to the second base station 16, be interfered by a further base station such as the third base station 18. It would be advantageous if also this situation is handled as interference is reduced between the first and the second base stations 14 and 16.

Figure 12:
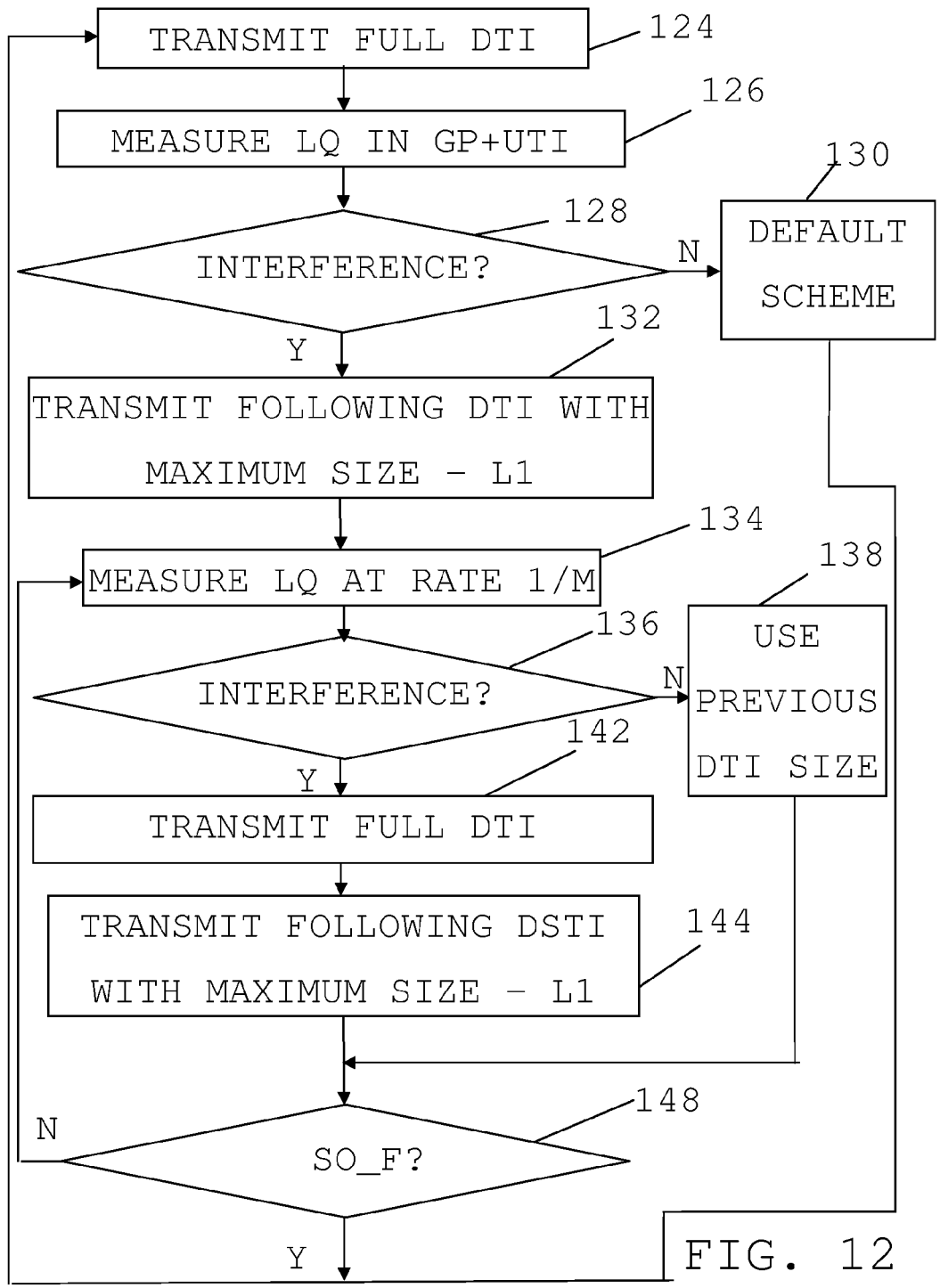
FIG. 12 shows a flow chart of a method of handling interference in the first base station according to a fifth embodiment of the invention.

This situation is addressed by a fifth embodiment of the invention, which will now be described with reference being made to FIG. 12, which shows a flow chart of a method of handling interference in the first base station according to this fifth embodiment.

Like in the third embodiment, this fifth embodiment starts with the transmission control unit 34 investigating if there is to be transmitted a sounding frame. In case there is to be transmitted a sounding frame, then the transmission control unit 34 guarantees or ensures that a full downlink time interval DTI is transmitted, step 124. This is followed by the interference investigating unit 30 measuring link quality in the guard period GP and uplink time interval UTI, step 126, which is also here done in the sounding frame, i.e. in the same frame in which a full downlink time interval DTI was guaranteed.

If interference is not detected, step 128, then the default scheme may be used, step 130, until it is again time to transmit a sounding frame, step 124.

However, if interference is detected, step 128, then the transmission control unit 34 employs the second interference reduction scheme based on the use of the time spread of the interference in the uplink time interval. The interference investigating unit 30 thus detects this time spread L1, which is used for obtaining the first interference limiting size for the variable downlink time interval. The transmission control unit then orders the radio communication unit 26 to transmit the following downlink time interval DTI with the first interference limiting size, i.e. with the maximum size minus the time spread L1, step 132. As this is done, the transmission control unit 34 increments or decrements the frame counter 33 and also starts the adjustment counter 35. In this way it is possible to take care of the interference between the first and the second base stations.

At the time of such a further investigation, i.e. when the adjustment counter 35 has been operated M times at a predefined interval after a transmission with the size set by the scheme but before the transmission of a subsequent scheduled sounding frame, the interference investigating unit 30 performs link quality measurements in the uplink time interval at the further investigation rate 1/M, step 134, and forwards the result of the investigations to the transmission control unit 34. However, in this embodiment the investigation concerns the question if there is still major interference and not if there is residual interference. The transmission control unit 34 thus investigates if there is any major interference when using the first interference limiting size. If there is not, step 136, then the previous downlink time interval size is used, i.e. the first interference limitation size, step 138, and the frame counter 33 and adjustment counter 35 operated until either of them reaches their respective values M or 0, or N or 0.

However, if there is major interference, step 136, which may be caused by the third base station 18, then the downlink time interval size is increased to the full size and transmitted, step 142. The detection of interference thus causes the provision of a sounding frame even though it is not yet time for it according to the used scheme, i.e. even though it is not yet time for it according to the frame rate 1/N.

This will signal to the new interfering base station, here the third base station 18, that that it is interfering, which will cause the third base station, if it operates in the same way, to also detect interference and then reduce the size of its downlink time interval.

Thereafter the transmission control unit 34 will reduce the size of the variable downlink time interval to the size used in the first frame after a sounding frame, and here through transmitting the following downlink time interval with the first interference limiting size, step 144. This means that as new interference is detected the scheme is restarted from the beginning. This also means that if for instance the third scheme were used there would here be a decrementing of one step from the full downlink time interval size.

This is then again followed by operating the frame counter or adjustment counter until either of them reaches their set value.

The next time that either of the counters reach its set value, the transmission control unit 34 investigates if it is time for a full downlink time interval DTI or a further investigation, i.e. if it is time for a new sounding frame. In case a new sounding frame is to be repeated, step 148, then a full downlink time interval DTI is again transmitted, step 124, while if it is not, then the link quality is measured, step 134, followed by investigating of interference, step 136.

In this way it is possible to consider the fact that further base stations start to interfere the first base station, like the third base station. This can also be applied on even more base stations like also if the fourth base station starts to interfere the first base station.

It is here also possible that incrementing steps are used when detecting interference instead of immediately using the maximum size. It is thus possible to incrementally increase the size of the downlink time interval when detecting interference.

It is here possible with a step in-between handling full interference and no interference, and that is residual interference, in which case the size may be reduced to the second interference limitation size or decremented.

Figure 13:
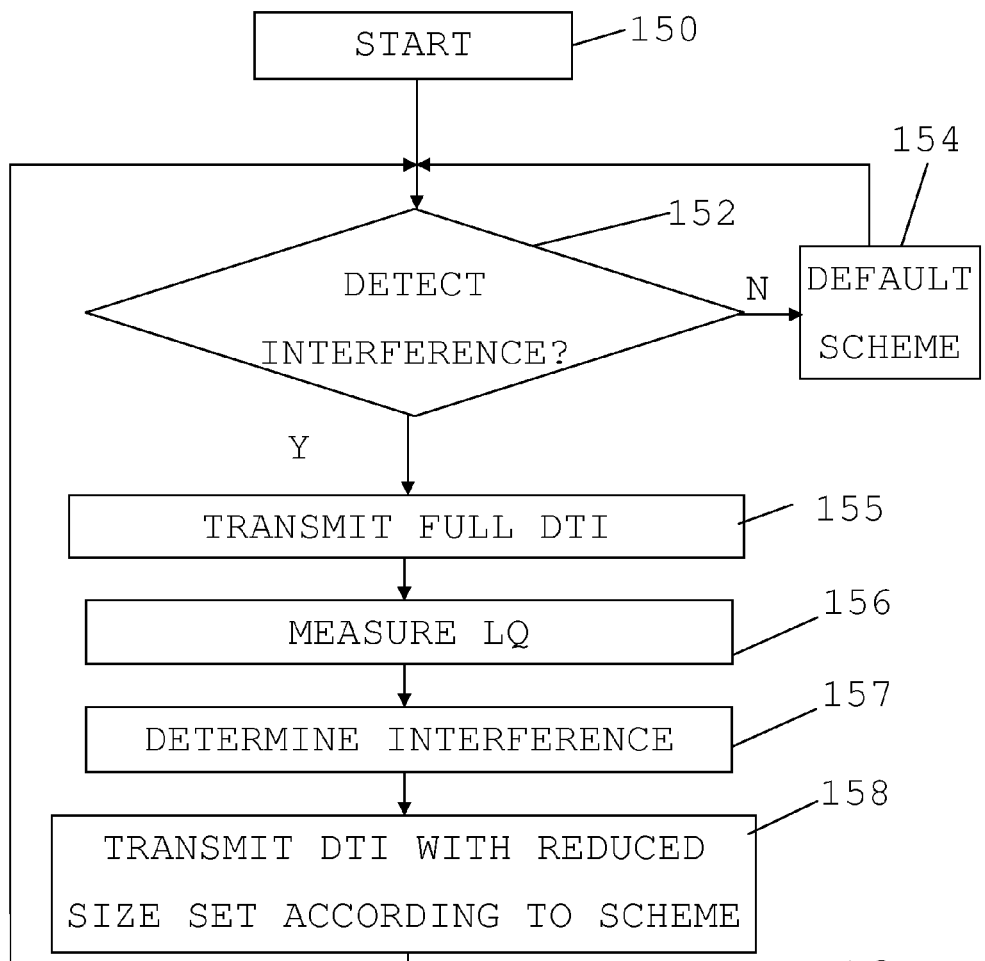
FIG. 13 shows a flow chart of a method of handling interference in the first base station according to a sixth embodiment of the invention, and FIG. 14 schematically shows a computer program product according to an embodiment of the invention in the form of a CD ROM disc.

It is possible to make further variations of this last embodiment in that sounding frames are only to be transmitted upon detection of interference, i.e. they are not transmitted with a certain repetition rate. A sixth embodiment describing this situation will now be described with reference being made to FIG. 13, which shows a flow chart of a method of handling interference in the first base station 14 according to this sixth embodiment.

When this method is started, step 150, the interference investigating unit 30 is set to continuously detect interference and as long as no interference is detected from another base station, step 152, then the default scheme may be used, step 154. However, if interference is detected, step 152, then the transmission control unit 34 makes the following frame into a sounding frame, where it guarantees or ensures that a full downlink time interval is transmitted, step 155, which is followed by measuring of link quality, step 156, and determining interference, step 157. This measuring may be performed in a following frame that is a possible candidate for a sounding frame, for instance a first following frame having a variable sized downlink time interval, guard period and uplink time interval, If, in the example of LTE, the sounding frame provided by the first base station itself is the second subframe, then the frame where measurements are performed could be the seventh subframe. It could also be the $12^{th}$ subframe, depending on the downlink-to-uplink switch point periodicity. The transmission control unit 34 then orders the radio communication unit 26 to transmit the following downlink time interval DTI with a size being reduced according to a chosen scheme, step 158. Thereafter the transmission control unit 34 goes back and awaits detection of interference by the interference investigating unit 30.

It can in this way be seen that the detection of interference will cause the issuing of a sounding frame followed by the reduction of the DTI interval according to an appropriate scheme. If all base stations operate according to this principle, they will automatically react to interference by alerting the other base stations with a sounding frame. They are thus triggered by the detection of interference to provide a sounding frame. An alerted base station will then respond by also providing a sounding frame. After alerting each base station then reduces the variable interval in order to reduce interference.

Even though the sounding frames in the sixth embodiment are not being sent according a scheme, it is possible to combine these sounding frames with further investigations according to a further investigation scheme, for instance the scheme employing the rate 1/M.

Above a number of different ways of reducing interference were described, for instance interference caused by atmospheric ducts, which can cause serious problems. This may be implemented using only slight modifications of existing base stations. The invention is therefore also easy to implement in existing systems.

Figure 14:
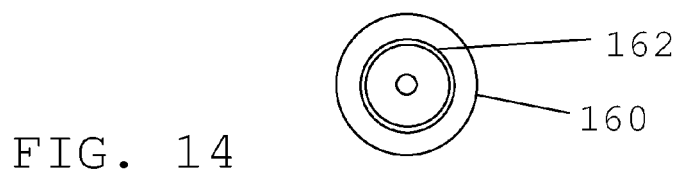

The interference handling module of the first base station may with advantage be provided in the form of a processor with associated program memory including computer program code for performing the functionality of the various units in it. It should be realized that this module may also be provided in the form of hardware, like for instance in the form of an Application Specific Integrated Circuit (ASIC) or a Digital Signal Processor (DSP). The computer program code may also be provided on a computer-readable means, for instance in the form of a data carrier, like a CD ROM disc or a memory stick, which will implement the function of the above-described interference handling module of a base station when being loaded into the above-mentioned program memory and run by the processor. One such computer program product in the form of a CD ROM disc 160 with such a computer program code 162 for providing the function of the interference handling module is schematically shown in FIG. 14.

While the invention has been described in connection with what is presently considered to be most practical and preferred embodiments, it is to be understood that the invention is not to be limited to the disclosed embodiments, but on the contrary, is intended to cover various modifications and equivalent arrangements. The invention is for instance not limited only to interference caused by atmospheric ducts. The interference may for instance also travel through lower layers of atmosphere and bounce between buildings. The invention is also possible to use if one base station has lost its synchronisation or because of the addition of base stations to the system. It is furthermore possible to use the same counter as a combined frame counter and adjustment counter, which can be combined with a counter control unit keeping track of when the above described set values are reached. Both these counters may also be omitted, since they are not needed in the last embodiment. Sounding frame and adjustment frames may in the context of LTE also be sounding subframes and adjusting subframes. Other sizes of downlink time intervals than the maximum may be used in a sounding frame as long as they are likely to provoke interference. Therefore the invention is only to be limited by the following claims. Furthermore, the invention is not limited to the specific order in which steps are presented in the method claims.

The invention claimed is:

1. A method implemented by a base station for handling interference in a wireless communication system that operates according to a synchronised time division duplex scheme, the method comprising:

transmitting from the base station a frame that is a sounding frame, wherein a frame comprises a downlink time interval of variable size and variable end position, an uplink time interval, and a guard period between the downlink time interval and uplink time interval, said guard period having a size adaptive to the size of the downlink time interval and starting at the end position of the downlink time interval, wherein the sounding frame includes a downlink time interval that has a pre-defined size long enough to provoke interference with another base station, measuring, by the base station, a link quality data parameter in a non-downlink time interval of the sounding frame, or of a frame following the sounding frame according to a frame structure used by the wireless communication system that includes a plurality of frames that follow one after another in time, determining, by the base station and based on said link quality data parameter, whether interference from another base station is present, and when interference from another base station is present according to said determining, reducing, by the base station, the size of variable downlink time intervals that follow the sounding frame, according to an interference reduction scheme for obtaining downlink time intervals with a guaranteed reduced size.

2. The method according to claim 1, further comprising applying a default scheme to said variable downlink time intervals that follow, when no interference from another base station is present according to said determining.

3. The method according to claim 1, wherein said transmitting comprises identifying the amount of data scheduled for transmission in the downlink time interval of the sounding frame, adding additional data in case less than the maximum amount of data is scheduled for transmission, and transmitting data in the downlink time interval of the sounding frame having the pre-defined size.

4. The method according to claim 1, wherein the interference reduction scheme specifies that the guaranteed reduced size is a minimum size.

5. The method according to claim 1, wherein the non-downlink time interval comprises an uplink time interval of the sounding frame, and wherein said measuring further comprises detecting the time duration of the interference in the uplink time interval, and wherein said reducing comprises reducing the size of said variable downlink time intervals to a first interference limiting size, wherein the first interference limiting size corresponds to the pre-defined size minus said detected time duration.

6. The method according to claim 5, further comprising determining, at regular predefined intervals between two consecutive sounding frames, whether residual interference is present, and, if residual interference is present, reducing the size of variable downlink time intervals that follow in the plurality of frames with said detected time duration in order to obtain variable downlink time intervals having a second interference limiting size.

7. The method according to claim 1, wherein the interference reduction scheme specifies that the size of downlink time intervals with guaranteed reduced size is to be decremented each time residual interference from another base station is present in a non-downlink time interval between two sounding frames.

8. The method according to claim 1, wherein said measuring is performed in a non-downlink time interval of said sounding frame, wherein the sounding frame is transmitting according to a sounding frame scheme, and wherein the method further comprises continuing to transmit downlink time intervals with guaranteed reduced size until transmission of a sounding frame is repeated.

9. The method according to claim 8, further comprising determining whether interference is present when the downlink time intervals have guaranteed reduced size and increasing the size of the downlink time interval if interference is present.

10. The method according to claim 9, wherein said increasing comprises incrementally increasing the size.

11. The method according to claim 9, wherein said increasing comprises increasing to a maximum size.

12. The method according to claim 1, wherein the transmission of a sounding frame is triggered by the detection of interference.

13. The method according to claim 1, wherein the size of the guard period is variable between a maximum size and a minimum size, and wherein the pre-defined size comprises the maximum size.

14. The method according to claim 1, wherein the pre-defined size is long enough to provoke interference with another base station and to trigger that another base station to reduce the size of variable downlink time intervals that follow the sounding frame, and wherein said determining comprises determining whether interference from another base station is present responsive to that another base station transmitting a sounding frame including a downlink time interval that has the pre-defined size.

15. The method according to claim 1, further comprising repeating said transmitting, measuring, determining, and reducing according to a pre-defined repetition rate.

16. A base station in a mobile communication system that operates according to a synchronized time division duplex scheme, the base station comprising: at least one antenna, a radio communication circuit configured to communicate with mobile stations of the system via the at least one antenna, and an interference handling circuit comprising an interference investigating circuit, and a transmission control circuit configured to:

transmit, via the radio communication circuit, a frame that is a sounding frame, wherein a frame comprises a downlink time interval of variable size and variable end position, an uplink time interval, and a guard period between the downlink time interval and uplink time interval, said guard period having a size adaptive to the size of the downlink time interval and starting at the end position of the downlink time interval, wherein the sounding frame includes a downlink time interval that has a pre-defined size long enough to provoke interference with another base station, order the interference investigating circuit to:

obtain and analyze a link quality data parameter in a non-downlink time interval of the sounding frame, or of a frame following the sounding frame according to a frame structure used by the wireless communication system that includes a plurality of frames that follow one after another in time, and determine based on said link quality data parameter whether interference from another base station is present, and when interference from another base station is present according to said determination, order the radio communication circuit to reduce the size of variable downlink time intervals that follow the sounding frame, according to an interference reduction scheme for obtaining time intervals with a guaranteed reduced size.

17. The base station according to claim 16, wherein the interference handling circuit further comprises a data identifying circuit and wherein the transmission control circuit, when transmitting a sounding frame, is further configured to order the data investigating circuit to identify the amount of data scheduled for transmission in the downlink time interval of the sounding frame, to order the radio communication circuit to add additional data in case less than the maximum amount of data is scheduled for transmission, and to order the radio communication circuit to transmit data in the downlink time interval of the sounding frame having the pre-defined size.

18. The base station according to claim 16, wherein the interference reduction scheme specifies that the guaranteed reduced size is a minimum size.

19. The base station according to claim 16, wherein the non-downlink time interval comprises an uplink time interval of the sounding frame, wherein the interference investigating circuit is further configured to detect the time duration of the interference in the uplink time interval, and wherein the transmission control circuit, when ordering the radio communication circuit to reduce the size of variable downlink time intervals that follow in the plurality of frames, is configured to order the reduction to a first interference limiting size, where the first interference limiting size corresponds to the pre-defined size minus said detected time duration.

20. The base station according to claim 19, wherein the transmission control circuit is further configured to order the interference investigating circuit to determine whether residual interference is present at regular predefined intervals of transmissions between two consecutive sounding frames, and to order the radio communication circuit to further reduce, if residual interference is present, the size of variable downlink time intervals that follow in the plurality of frames with said detected time duration, in order to obtain variable downlink time intervals having a second interference limiting size.

21. The base station according to claim 16, wherein the interference reduction scheme specifies that the size of downlink time intervals with guaranteed reduced size is to be decremented each time residual interference from another base station is present in a non-downlink time interval between two sounding frames.

22. The base station according to claim 16, wherein the transmission control circuit is configured, when ordering the interference investigating circuit to obtain measurements of a link quality data parameter in a non-downlink time interval of said sounding frame, to order the radio communication circuit to transmit sounding frames according to a sounding frame scheme and is configured to order the radio communication circuit to continue to transmit downlink time intervals with guaranteed reduced size until transmission of a sounding frame is to be repeated.

23. The base station according to claim 22, wherein the interference investigating circuit is further configured to determine whether there is interference when the downlink time intervals have guaranteed reduced size, and wherein the transmission control circuit is further configured to order the radio communication circuit to increase the size of the downlink time interval if interference is present.

24. The base station according to claim 23, wherein the increase comprises an incremental increase of the size.

25. The base station according to claim 23, wherein the increase comprises an increase to the maximum size.

26. The base station according to claim 16, wherein the transmission control circuit is configured to provide a sounding frame triggered by the detection of interference.

27. The base station of claim 16, wherein the size of the guard period is variable between a maximum size and a minimum size, and wherein the pre-defined size comprises the maximum size.

28. The base station of claim 16, wherein the pre-defined size is long enough to provoke interference with another base station and to trigger that another base station to reduce the size of variable downlink time intervals that follow the sounding frame, and wherein said transmission control circuit is configured to order the interference investigating circuit to determine whether interference from another base station is present responsive to that another base station transmitting a sounding frame including a downlink time interval that has the pre-defined size.

29. The base station of claim 16, wherein the transmission control circuit is configured to repeat said transmitting and ordering according to a pre-defined repetition rate.

30. A computer program product stored on a non-transitory computer readable medium and comprising computer program code that, when run on a processor associated with an interference investigating module of a base station in a mobile communication system, causes the interference investigating module to handle interference in the system, wherein the system operates according to a synchronized time division duplex scheme, wherein the computer program code causes the interference investigating module to:

transmit a frame that is a sounding frame, wherein a frame comprises a downlink time interval of variable size and variable end position, an uplink time interval, and a guard period between the downlink time interval and uplink time interval, said guard period having a size adaptive to the size of the downlink time interval and starting at the end position of the downlink time interval, wherein the sounding frame includes a downlink time interval that has a pre-defined size long enough to provoke interference with another base station, measure a link quality data parameter in a non-downlink time interval of the sounding frame, or of a frame following the sounding frame according to a frame structure used by the wireless communication system that includes a plurality of frames that follow one after another in time, determine based on said link quality data parameter whether interference from another base station is present, and when interference from another base station is present according to said determination, reduce the size of variable downlink time intervals that follow the sounding frame, according to an interference reduction scheme for obtaining downlink time intervals with guaranteed reduced size.

* * * * *